United States Patent
Gao et al.

(10) Patent No.: US 12,107,839 B2
(45) Date of Patent: Oct. 1, 2024

(54) DOMAIN SPECIFIC BROWSER IDENTIFIERS AS REPLACEMENT OF BROWSER COOKIES

(71) Applicant: Google LLC, Mountain View, CA (US)

(72) Inventors: Yian Gao, Sunnyvale, CA (US); Gang Wang, Frederick, MD (US)

(73) Assignee: Google LLC, Mountain View, CA (US)

( * ) Notice: Subject to any disclaimer, the term of this patent is extended or adjusted under 35 U.S.C. 154(b) by 30 days.

(21) Appl. No.: 18/163,740

(22) Filed: Feb. 2, 2023

(65) Prior Publication Data

US 2023/0188507 A1    Jun. 15, 2023

Related U.S. Application Data

(63) Continuation of application No. 16/322,466, filed as application No. PCT/US2018/026287 on Apr. 5, 2018, now Pat. No. 11,601,404.

(51) Int. Cl.
    *H04L 29/06* (2006.01)
    *G06F 21/60* (2013.01)
    (Continued)

(52) U.S. Cl.
    CPC ........ *H04L 63/0421* (2013.01); *G06F 21/602* (2013.01); *G06F 21/6254* (2013.01);
    (Continued)

(58) Field of Classification Search
    CPC ... H04L 63/0421; H04L 9/0643; H04L 67/02; H04L 67/146; H04L 9/0662;
    (Continued)

(56) References Cited

U.S. PATENT DOCUMENTS 7,478,434 B1    1/2009  Hinton et al.
7,904,470 B2 *  3/2011  Kuerschner ............. H04L 67/56
                                                          707/785

(Continued)

FOREIGN PATENT DOCUMENTS

CN    101727553    6/2010
CN    102638581    8/2012
(Continued)

OTHER PUBLICATIONS

Xia et al., "MeDShare: Trust-Less Medical Data Sharing Among Cloud Service Providers via Blockchain", IEEE Access, Received Jun. 21, 2017, accepted Jul. 11, 2017, date of publication Jul. 24, 2017, date of current version Aug. 14, (Year: 2017).*

(Continued)

*Primary Examiner* — Morshed Mehedi
(74) *Attorney, Agent, or Firm* — Fish & Richardson P.C.

(57) ABSTRACT

The present disclosure provides a secure, user-transparent, and highly efficient content provider-specific identifier ("CPSID"), sometimes referred to as a "read-only cookie" ("ROC"). These content provider-specific identifiers may be generated by the client device and encrypted with a public key of the content provider, preventing third parties from indirectly identifying matches, and obviating the need for provider-side cookie matching tables and resource-intensive tracking communications. The generation of content provider-specific identifiers may be controlled by user policies, such that identifiers are only created for content providers with compliant terms of service (ToS), e.g., retrievable from a predetermined address within the domain; content providers that are on a whitelist (e.g. for which the user has explicitly provided consent); and/or content providers that are not on a blacklist (e.g. for which the user has explicitly refused consent).

20 Claims, 7 Drawing Sheets

(51) Int. Cl.
*G06F 21/62* (2013.01)
*H04L 9/06* (2006.01)
*H04L 9/40* (2022.01)
*H04L 67/02* (2022.01)
*H04L 67/146* (2022.01)

(52) U.S. Cl.
CPC ............ *H04L 9/0643* (2013.01); *H04L 67/02* (2013.01); *H04L 67/146* (2013.01)

(58) Field of Classification Search
CPC ............... H04L 9/0894; H04L 63/0407; H04L 63/0442; H04L 67/22; H04L 67/306; G06F 21/602; G06F 21/6254; G06F 21/6263; G06Q 30/0277
See application file for complete search history.

(56) References Cited

U.S. PATENT DOCUMENTS

| | | | | |
|---|---|---|---|---|
| 10,348,695 | B1* | 7/2019 | Khassanov | G06F 12/1408 |
| 10,630,648 | B1* | 4/2020 | Borunda | H04W 12/068 |
| 2009/0172091 | A1 | 7/2009 | Hamel | |
| 2010/0100957 | A1* | 4/2010 | Graham | G06Q 10/107 |
| | | | | 726/22 |
| 2011/0055552 | A1* | 3/2011 | Francis | H04L 63/0421 |
| | | | | 713/153 |
| 2013/0121490 | A1* | 5/2013 | Boliek | H04L 9/0825 |
| | | | | 380/255 |
| 2013/0208893 | A1* | 8/2013 | Shablygin | H04L 9/0894 |
| | | | | 380/277 |
| 2015/0149657 | A1* | 5/2015 | Reddy | H04L 45/72 |
| | | | | 709/242 |
| 2016/0359632 | A1* | 12/2016 | Mohajeri | H04W 12/02 |
| 2016/0371507 | A1* | 12/2016 | Jakobsson | H04L 67/143 |
| 2017/0053282 | A1* | 2/2017 | Olumofin | G06Q 20/3224 |
| 2017/0169100 | A1 | 6/2017 | Reshadi et al. | |
| 2017/0180127 | A1* | 6/2017 | Burbank | H04L 63/0414 |
| 2018/0041601 | A1 | 2/2018 | Park et al. | |
| 2018/0063084 | A1* | 3/2018 | Wakumoto | H04L 45/42 |
| 2019/0251198 | A1* | 8/2019 | Shamsutdinov | G06F 21/602 |

FOREIGN PATENT DOCUMENTS

| | | |
|---|---|---|
| CN | 102783115 | 11/2012 |
| CN | 102859509 | 1/2013 |
| CN | 105850100 | 8/2016 |
| CN | 106471539 | 3/2017 |
| CN | 107251528 | 10/2017 |
| CN | 107256366 | 10/2017 |
| JP | 2011-034290 | 2/2011 |
| JP | 2015-533235 | 11/2015 |
| KR | 10-2006-0056311 | 5/2006 |
| KR | 10-2009-0057171 | 6/2009 |
| WO | WO 2009110622 | 9/2009 |
| WO | WO 2014036119 | 3/2014 |
| WO | WO 2015179424 | 11/2015 |

OTHER PUBLICATIONS

International Preliminary Report on Patentability in International Appln. No. PCT/US2018/026287, mailed on Oct. 6, 2020, 8 pages.
International Search Report and Written Opinion in International Appln. No. PCT/US2018/026287, mailed on Sep. 3, 2018, 15 pages.
Office Action in European Appln No. 18721540.5, dated Dec. 10, 2021, 5 pages.
Office Action in European Appln No. 18721540.5, dated Feb. 23, 2023, 6 pages.
Office Action in Indian Appln. No. 202027040171, dated Dec. 12, 2021, 7 pages (with English translation).
Office Action in Japanese Appln. No. 2020-554258, dated Aug. 1, 2022, 5 pages (with English translation).
Office Action in Japanese Appln. No. 2020-554258, dated Feb. 28, 2022, 9 pages (with English translation).
Office Action in Japanese Appln. No. 2020-554258, dated Nov. 15, 2021, 9 pages (with English translation).
Office Action in Korean Appln. No. 10-2020-7029517, dated Apr. 11, 2022, 3 pages (with English translation).
Office Action in Korean Appln. No. 10-2020-7029517, dated Sep. 27, 2021, 13 pages (with English translation).
Sun et al., "Cross-Domain Data Sharing in Distributed Electronic Health Record Systems", IEEE Transactions on Parallel and Distributed Systems, vol. 21, No. 6, Jun. 2010, 11 pages.
Office Action in Chinese Appln. No. 201880092162.9, mailed on Sep. 19, 2023, 16 pages (with English translation).
Extended Search Report in European Appln. No. 24165174.4, dated Jun. 10, 2024, 8 pages.
Notice of Allowance in Chinese Appln. No. 201880092162.9, mailed on Feb. 27, 2024, 7 pages (with English translation).

* cited by examiner

| Device ID | Content Server #1 ID | Content Server #2 ID | Content Server #... ID |
|---|---|---|---|
| 11111 | 14a6f5ac | 1270dba2 | c26f8de1 |
| 11112 | 981ad31b | 486bca19 | 28a123c3 |
| 11113 | 16a81f37e | 56a8e37d | 768qd98b |

DOMAIN SPECIFIC BROWSER IDENTIFIERS AS REPLACEMENT OF BROWSER COOKIES

CROSS-REFERENCE TO RELATED APPLICATIONS

This application is a continuation of, and claims priority to, U.S. patent application Ser. No. 16/322,466, filed on Jan. 31, 2019, which application claims the benefit of priority as a U.S. National Stage under 35 U.S.C. § 371 of International Patent Application No. PCT/US2018/026287, filed Apr. 5, 2018, and designating the United States, which are hereby incorporated by reference herein in their entirety.

BACKGROUND

Browser cookies, or short device-, user-, or session-specific identifiers, are used for uniquely (or semi-uniquely) identifying a device, user, or session to a content provider, such as a web page publisher, advertiser, or other such entity. These cookies are typically generated by the content provider, e.g., during a first session or login process, and provided in subsequent requests from the browser or other application of the client device. The publisher may then associate each request with the same identifier (and implicitly, the same device, user, or session), allowing customization of content selection.

However, typical browser cookies have some critical drawbacks. Third party content providers that provide embedded content within a website may provide cookies to track a browser, without the user necessarily being aware that they are being identified or tracked by these third parties (e.g., because the address shown in the browser address bar may only identify the source of the main page and not necessarily the embedded content). Thus, it may be difficult for users to identify potential privacy issues and control privacy of their personal information.

Additionally, typical browser cookies are domain specific. In an attempt to provide some measure of security, browser and other application manufacturers prevent a content provider from reading or receiving cookies generated by other content providers at other domains. To work around this, both for legitimate and illegitimate reasons, content providers utilize cookie matching to generate associations between a cookie from one content provider and a cookie of another content provider. One implementation of cookie matching utilizes small embedded content items within a page (e.g. 1 pixel by 1 pixel "invisible" images that cause the browser to request the image, along with transmission of a corresponding cookie, referred to as "tracking pixels"), with the request received by one entity and redirected to another entity. This results in two round trip communication exchanges to "render" the pixel: a request to the first entity and response with the redirection address, and a request to the second entity and response. For a typical page with ten or more embedded tracking pixels, performing these communications may take significant time. If the user navigates away from the page before the communications are complete, the match may not be identified. As a result, cookie matching is slow, frequently incomplete, slows down rendering of the web page, and consumes bandwidth and reduces battery life. Furthermore, cookie matching allows third party entities to track online behavior in a non-transparent way and without the user providing explicit consent, which is a threat to user privacy.

SUMMARY

The systems and methods discussed herein provide a replacement for traditional browser cookies with a secure, user-transparent, and highly efficient content provider-specific identifier ("CPSID"), sometimes referred to as a "read-only cookie" ("ROC"). These content provider-specific identifiers may be generated by the client device and encrypted with a public key of the content provider, preventing third parties from indirectly identifying matches, and obviating the need for provider-side cookie matching tables and resource-intensive cookie matching communications and systems that prevent user-transparency and clear understanding and auditing of cookie usage. The generation of content provider-specific identifiers may be controlled by user policies, such that identifiers are only created for content providers with compliant terms of service (ToS), e.g., retrievable from a predetermined address within the domain; content providers that are on a whitelist (e.g. for which the user has explicitly provided consent); and/or content providers that are not on a blacklist (e.g. for which the user has explicitly refused consent).

The content provider-specific identifier may be generated as a cryptographic hash (e.g. any suitable hashing algorithm, such as MD5, SHA256, etc.) from inputs of a browser-, application-, device-, or session-specific private identifier (e.g. an identifier specific to an instance of a browser for a particular user, separate from other users of the device), and a domain name or address of a content provider (e.g. "example.com"). In some implementations, to provide additional salt, the hash input may include a creation time or expiration time for the content provider-specific identifier, which may be concatenated with either input value, for example. Other sources of entropy may be utilized to similarly increase the complexity of the hash inputs, such as device types or serial numbers, clock skew times, hardware identifiers, or any other such data. In some implementations, the "expiration time" may be a granular value, such as a number of weeks, months, or years before the content provider-specific identifier expires, allowing automatic regeneration by the client.

In other implementations, the content provider-specific identifier may be a randomly generated value stored in a lookup table keyed by the domain of the content provider (e.g., example.com). This may require fewer processor resources than calculating the cryptographic hash result, but may require a large storage space for the table.

The content provider-specific identifier may be encrypted by the client device via a public key of the content provider to generate an encrypted read-only cookie ("eROC"). In some implementations, the client device may concatenate the content provider-specific identifier with a creation timestamp and/or a random number (e.g. a nonce salt) prior to encryption, such that the resulting eROCs even for a single domain are highly varying. Thus, the intended content provider may be able to decrypt and extract the content provider-specific identifier, while other content providers (e.g., those attempting to perform cookie matching) will be unable to do so. To protect eROCs during transmission from client device to an intended content provider through the intermediary, the creation timestamp and/or nonce value may be used to generate unstable eROCs that are useless or undecipherable by anybody else but the intended content provider. To allow for data exchange between content providers, a first content provider may request an eROC from the client device for a second content provider, and may forward the received eROC to the second content provider. Because the received cookie is encrypted with the second content provider's public key, the first content provider may be able unable to decrypt or recover the second content provider's ROC, but may instead merely forward the eROC and request associated data. Having possession of the proper eROC therefore indicates authorization by the client device for data exchange. Because each request must traverse the client device, the client device may control privacy and exchange of data between content providers, and also generate an audit log or data exchange log for any such transfer, increasing transparency for the user.

These implementations are mentioned not to limit or define the scope of the disclosure, but to aid in understanding it. Particular implementations may be developed to realize one or more of the following advantages. By replacing traditional browser cookies with encrypted content provider-specific identifiers, the user of the client device has greater control over private data including data exchanges between partner content providers, with a transparent audit log that identifies any such exchanges. Furthermore, by leveraging cookie generation and encryption on the client device, resource consumption from large cookie matching tables at content providers is avoided, increasing efficiency. The elimination of tracking pixels and dual-round trip communications for cookie matching also increases efficiency and better protects user privacy, allowing the client browser or application to render pages faster, with less battery and processor utilization.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 1C is an illustration of an example cookie matching table, according to some implementations;

Like reference numbers and designations in the various drawings indicate like elements.

DETAILED DESCRIPTION

Browser cookies, or short device-, user-, or session-specific identifiers, are used for uniquely (or semi-uniquely) identifying a device, user, or session to a content provider, such as a web page publisher, advertiser, or other such entity. These cookies are typically generated by the content provider, e.g., during a first session or login process, and provided in subsequent requests from the browser or other application of the client device. The publisher may then associate each request with the same identifier (and implicitly, the same device, user, or session), allowing customization of content selection.

Figure 1A:
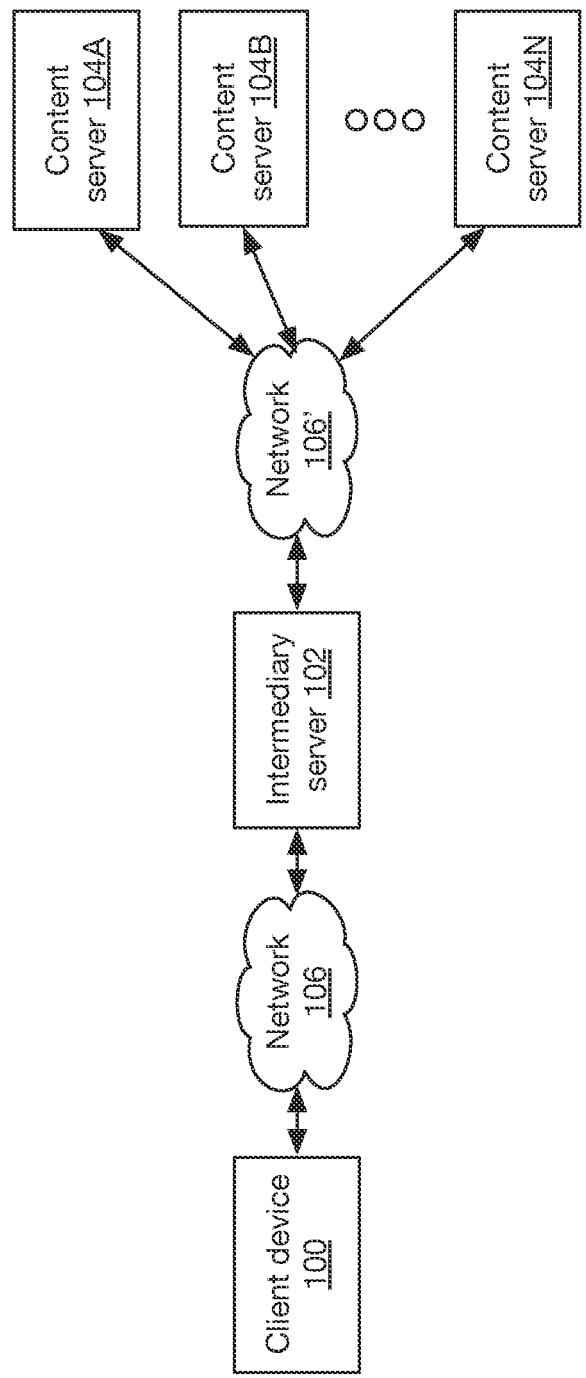
FIG. 1A is a block diagram of a network and device environment for data exchange, according to some implementations.

For example, FIG. 1A is a block diagram of a network and device environment for data exchange, according to some implementations. As shown, a client device 100 may communicate via networks 106, 106' with one or more content servers 104-104N, referred to generally as content server(s) or content provider(s) 104. Client device 100 may comprise any type and form of computing device, including a desktop computer, laptop computer, portable computer, tablet computer, wearable computer, embedded computer, smart television, console, Internet of Things (IoT) device or smart appliance, or any other type and form of computing device. In many implementations, client device 100 may execute an application to request content, such as a web browser, social media application, video game, or other such application. Client device 100 may request content and may provide a device identifier, cookie, or other such identifier such that a content provider may select customized content for the corresponding device or a user of the device.

Networks 106, 106' may comprise any type and form of network, including local area networks (LANs), wide area networks (WANs) such as the Internet, satellite networks, cable networks, broadband networks, fiber optic networks, microwave networks, cellular networks, wireless networks, or any combination of these or other such networks. Networks 106, 106' may be the same type of network or different types, and may include a plurality of additional devices (not illustrated), including gateways, modems, firewalls, routers, switches, etc. Networks 106, 106' may also include any number of computing devices (e.g., computer, servers, routers, network switches, etc.) that are configured to receive and/or transmit data within network 106, 106'. Network 106, 106' may further include any number of hardwired and/or wireless connections. A client device 100 may communicate wirelessly (e.g., via WiFi, cellular, radio, etc.) with a transceiver that is hardwired (e.g., via a fiber optic cable, a CAT5 cable, etc.) to other computing devices in network 106, 106'. In some implementations, a network 106, 106' may be a virtual network, such as a virtual network between a plurality of virtual machines executed by a single physical machine, or an abstract network such as an offline transfer of data via physically movable media (e.g., a Sneakernet, transferring data via tape media, CD-ROM, flash media, external hard drives, floppy disks, etc.).

In many implementations, communications may flow via an intermediary server 102, which may serve to select content providers from a pool or plurality of available providers. For example, in some implementations, intermediary server 102 may receive a request for content from client device 100 and may select from among content providers 104 a content provider to provide the requested content. In some implementations, such selection may be via load balancing algorithms, auction algorithms (e.g., with providers bidding for opportunities to provide content), etc. The intermediary server 102 may thus be referred to as an exchange server, a load balancer, an auction provider, or by any other such term. Although shown between networks 106, 106', in many implementations, intermediary server 102 may be deployed on the same network segment as a content server 104.

Intermediary server 102 and content server(s) 104 may comprise any type and form of computing device, including desktop computers, servers, workstations, laptop computers, portable computers, embedded computers, or any other type and form of computing device. In many implementations, intermediary server 102 and/or content server(s) 104 may comprise virtual machines executed by one or more physical computing devices, and may be configured as a server farm, cluster, or cloud of devices.

As discussed above, cookies may be utilized to provide customized content. For example, when issuing a request for content, a client device 100 may provide a device identifier or cookie to an intermediary server 102. To maintain client privacy, in some implementations, the intermediary server 102 may not forward the cookie to content server(s) 104; rather, the intermediary server 102 may maintain a matching table of identifiers for each content server 104 and the cookie of the client device 100. Upon receipt of the cookie, the intermediary server 102 may search for the cookie in the matching table and retrieve identifiers for each content provider; the intermediary server 102 may then transmit the content provider identifier to each content provider with the request for content.

Figure 1B:
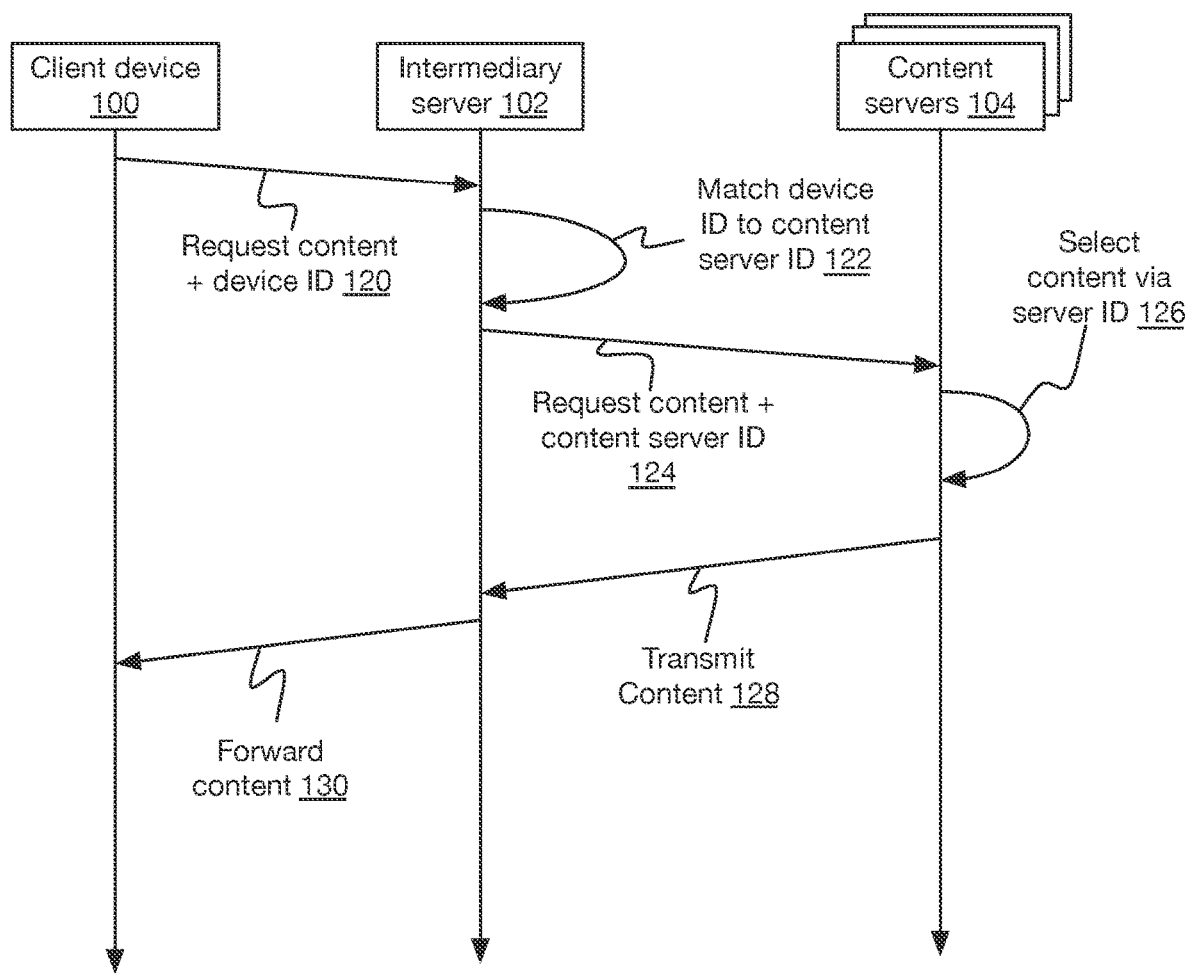
FIG. 1B is a flow diagram illustrating traditional cookie exchange and matching, according to some implementations.

For example, FIG. 1B is a flow diagram illustrating traditional cookie exchange and matching, according to some implementations. At step 120, a client device 100 may request an item of content and provide a device identifier or cookie corresponding to the device, user, or session to the intermediary server 102. At step 122, the intermediary server 102 may match the received cookie to cookies for each content server 104. At step 124, the intermediary server may transmit a request for content and a cookie corresponding to a content server 104 to each content server 104 (thus, although only one transmission is shown, in many implementations, many requests may be sent in series or parallel at step 124. At step 126, each content server 104 may select customized content using the content server identifier, and may provide the content to the intermediary server at step 128. The intermediary server 102 may then forward one (e.g., the first received content, in some implementations) or all of the received content to the client device at step 130.

The illustrated implementation is just one way of providing customized content using browser cookies, and many other similar implementations are possible. For example, in some implementations, the intermediary server may transmit a request to content servers 104 with the corresponding content server identifiers, and one or more content servers 104 may respond with a bid for an opportunity to provide content to the client device. The intermediary server 102 may select a winning bid and request the selected content from a single server.

In other implementations, cookie matching may be performed by the content servers 104 with similar matching tables. The content servers 104 may receive the cookie provided by the client device and forwarded by the intermediary server (said cookie referring to or associated with the intermediary server's domain) and look up corresponding cookies in their own matching tables. Thus, in each implementation, to provide a measure of privacy, cookies are domain or content server specific and not shared between content servers 104 at different domains, and must be matched with a cookie provided by a client device.

Typical browser cookies have some critical drawbacks. Third party content providers 104 that provide embedded content within a website may provide cookies to track a browser, without the user necessarily being aware that they are being identified or tracked by these third parties (e.g., because the address shown in the browser address bar may only identify the source of the main page and not necessarily the embedded content). Thus, it may be difficult for users to identify potential privacy issues and control privacy of their personal information.

Because typical browser cookies are domain specific, as noted above, content providers utilize cookie matching to generate associations between a cookie from one content provider and a cookie of another content provider. One implementation of cookie matching utilizes small embedded content items within a page (e.g., 1 pixel by 1 pixel "invisible" images that cause the browser to request the image, along with transmission of a corresponding cookie, referred to as "tracking pixels"), with the request received by one entity and redirected to another entity. This results in two round trip communication exchanges to "render" the pixel: a request to the first entity and response with the redirection address, and a request to the second entity and response. For a typical page with ten or more embedded tracking pixels, performing these communications may take significant time. If the user navigates away from the page before the communications are complete, the match may not be identified. As a result, cookie matching is slow, frequently incomplete, slows down rendering of the web page, and consumes bandwidth and reduces battery life. Furthermore, cookie matching allows third party entities to track online behavior in a non-transparent way and without the user providing explicit consent, which is a threat to user privacy. In addition, after the cookie matching table is populated, the intermediary server and content servers can freely share user data thereafter without any user transparency and control, as further requests and data exchanges between the servers need not traverse the client device. Such user data sharing may continue even if the users clears cached cookies or account identifiers on the client device. Even the use of opt-out mechanisms at the servers may not provide security or privacy.

FIG. 1C is an illustration of an example cookie matching table 135, according to some implementations. An intermediary server 102 may maintain such a table 135, for example, and populate the table with device identifiers or cookies, and content server cookies. As shown, the table may grow very large, very quickly, as a function of the number of client devices and content servers. In typical implementations with tens or hundreds of thousands of client devices or more, and hundreds or thousands of content providers, the table may require significant storage, and require a large amount of server resources (e.g., processor time and memory) for searching to identify matches.

Thus, traditional browser cookie implementations may be slow and inefficient, consume large amounts of server resources, be inaccurate or poorly matched due to the long delays during tracking and creation of matching tables, and may add significant delay to the rendering of web pages due to the additional back and forth communications from tracking pixels. Additionally, these implementations may have poor security or privacy, and/or may have a lack of auditing or transparency for users, who may not be able to determine if or how their private information is being shared.

Instead, the systems and methods discussed herein provide a replacement for traditional browser cookies with a secure, user-transparent, and highly efficient content provider-specific identifier ("CPSID"), sometimes referred to as a "read-only cookie" ("ROC"). These content provider-specific identifiers may be generated by the client device and encrypted with a public key of the content provider, preventing third parties from indirectly identifying matches, and obviating the need for provider-side cookie matching tables and resource-intensive tracking communications. The generation of content provider-specific identifiers may be controlled by user policies, such that identifiers are only created for content providers with compliant terms of service (ToS), e.g., retrievable from a predetermined address within the domain; content providers that are on a whitelist (e.g. for which the user has explicitly provided consent); and/or content providers that are not on a blacklist (e.g. for which the user has explicitly refused consent).

The content provider-specific identifier may be generated as a cryptographic hash (e.g. any suitable hashing algorithm, such as MD5, SHA256, etc.) from inputs of a browser-, application-, device-, or session-specific private identifier (e.g. an identifier specific to an instance of a browser for a particular user, separate from other users of the device), and a domain name or address of a content provider (e.g. "example.com"). In some implementations, to provide additional salt, the hash input may include a creation time or expiration time for the content provider-specific identifier, which may be concatenated with either input value, for example. Other sources of entropy may be utilized to similarly increase the complexity of the hash inputs, such as device types or serial numbers, clock skew times, hardware identifiers, or any other such data. In some implementations, the "expiration time" may be a granular value, such as a number of weeks, months, or years before the content provider-specific identifier expires, allowing automatic regeneration by the client. In some implementations, the content provider-specific identifier may be unified across applications on the client device, such that the same content provider-specific identifier may be used for requests from each browser, mobile application, webview, etc. on the device. For example, the inputs to the cryptographic hash may include the domain name or address of the content provider plus a device specific identifier, such that the inputs are identical regardless of what application triggered the hash calculation (e.g., a web browser vs. a video game on the device).

In other implementations, the content provider-specific identifier or read only cookie (ROC) may be a randomly generated value stored in a lookup table keyed by the domain of the content provider (e.g., example.com). This may require fewer processor resources than calculating the hash result, but may require a large storage space for the table.

The content provider-specific identifier may be encrypted by the client device via a public key of the content provider to generate an encrypted read-only cookie ("eROC"). In some implementations, the client device may concatenate the content provider-specific identifier with a creation timestamp and/or a random number (e.g., a nonce salt) prior to encryption, such that the resulting eROCs even for a single domain are highly varying. Thus, the intended content provider may be able to decrypt and extract the content provider-specific identifier, while other content providers (e.g., those attempting to perform cookie matching) or malicious intermediaries (e.g., Man-in-the-middle attackers) that intercept the identifier will be unable to do so. To allow for data exchange between content providers, a first content provider may request an eROC from the client device for a second content provider, and may forward the received eROC to its designated or "rightful" owner, i.e., the second content provider. Because the received cookie is encrypted with the second content provider's public key, the first content provider is unable to decrypt or recover the original ROC for the second content provider, but may instead merely forward the eROC and request associated data. Having possession of the proper eROC therefore indicates authorization by the client device for user data exchange. Because each request must traverse the client device, the client device may control privacy and exchange of data between content providers, and also generate an audit log or data exchange log for any such transfer, increasing transparency for the user.

Figure 1D:
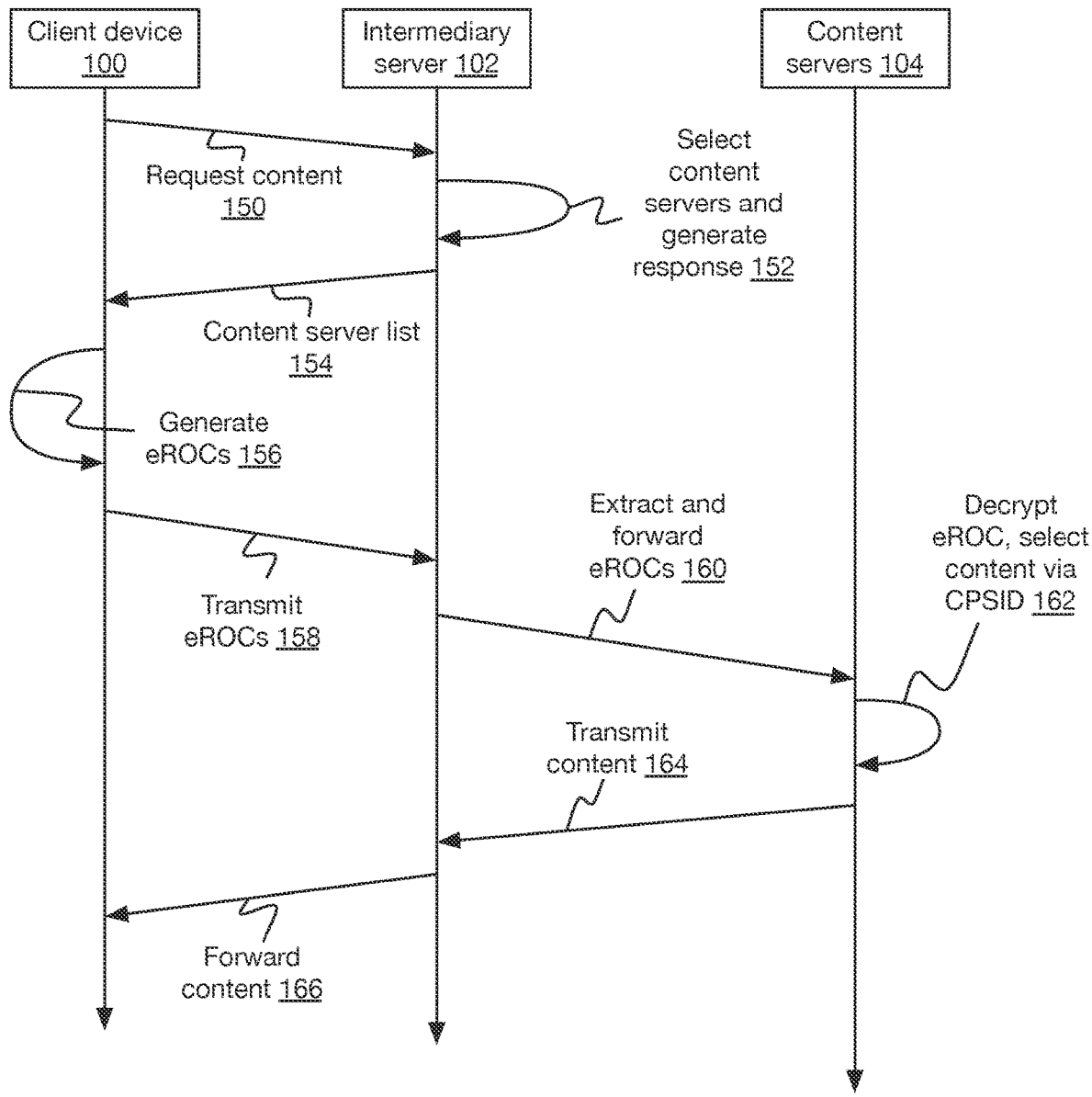
FIG. 1D is a flow diagram illustrating device identifier exchange utilizing content provider-specific identifiers (read-only cookies or "ROCs"), according to some implementations.

FIG. 1D is a flow diagram illustrating cookie exchange utilizing content provider-specific identifiers, according to some implementations. At step 150, a client device 100 may request an item of content. In some implementations, the request may be generated during rendering of a web page, e.g., a request for embedded content in the page, such as a banner or other image, a media file such as a pre-roll, post-roll, or interstitial media file, or any other such content. In some implementations, the request may be for an unknown item of content, such that a content server 104 may select an appropriate item of content. The request may, in some implementations, include a device identifier or other identifier of the client device, including a user name, account name, address or hardware identifier, or any other such information.

At step 152, the intermediary server may receive the request and select one or more content servers or providers to provide content to the client device 100. In some implementations, the selection of content servers may be based on load balancing requirements, auction winners, or any other such method. For example, the intermediary server 102 may select ten content servers 104 from a list of content servers to potentially provide content, and may rotate through the servers with each new request. In some implementations, the intermediary server may communicate with content servers 104 to request bids or other offers for an opportunity to provide content to client device 100. The intermediary server may select a winning bid or bids to provide content.

The intermediary server 102 may generate a response identifying content servers that have been selected to potentially exchange data with the client device 100. The response may comprise a domain or address of each selected content server 104 or other such identifier, with the identifiers concatenated together. In some implementations, the identifiers may have a predetermined length, such as 32 or 64 bytes, with shorter domains or addresses padded and longer domains truncated. The identifiers may then be concatenated directly, as the client device 100 may extract each identifier according to the predetermined length. In other implementations, the identifiers may be separated by delimiters (e.g., predetermined characters or strings). At step 154, the intermediary server may transmit the list of identifiers to the client device.

At step 156, the client device may generate an encrypted read-only cookie or content provider-specific identifier for each content server in the list. As discussed above, the client device may extract an identifier of a content provider, such as a domain name or address, from the list. The client device may calculate a cryptographic hash of the domain name or address, plus a private key or identifier maintained by the client device 100 and not shared with other devices. In some implementations, additional salt may be applied to the hash or additional data may be used as a source of entropy, such as a creation date of the cookie or expiration date of the cookie. In some implementations, the "expiration time" may be a granular value, such as a number of weeks, months, or years before the content provider-specific identifier expires, allowing automatic regeneration by the client. Any suitable one-way hashing function may be used, with a suitable hashing function having few or no collisions within the utilized address space (e.g., domain or address length, plus the private key, plus any additional entropic salt). Hash functions may include MD5, SHA256, or any other such function. In some implementations, rather than calculating a hash result, the client device may instead maintain a lookup table of random values, e.g., calculated using a private key or identifier of the client device as a seed, or otherwise generated (e.g., from the output of a random number generator or pseudorandom number generator). The indices to the lookup table may comprise the domain or address of the content providers. In some implementations, the lookup table may be pregenerated, while in other implementations, the client device may add entries to the lookup table for each domain or provider identifier if an entry does not already exist.

Accordingly, whether generated via the cryptographic hash function or the random data in the lookup table, the client device may retrieve or create a unique identifier specific to each content provider, but repeatable, in that the client device may retrieve or create the same identifier for further requests for a cookie for the content provider (at least until the expiration of the cookie, or user reset, in some implementations).

To provide security for the cookies, the client device 100 may encrypt each cookie using a public encryption key of the content provider. The keys may be pre-retrieved, or dynamically retrieved during cookie generation (e.g., the client device may retrieve the key from a predetermined location or address at a content provider's domain, such as a "key.html" file for an "example.com" domain, or "example.com/key.html"). Accordingly, the client device may generate an encrypted read-only cookie or eROC for each content provider identified in the list at step 154. These eROCs may be provided in a further request to the intermediary server 102 at step 158. In some implementations, the eROCs may be concatenated directly, and may have a predetermined length (e.g., 64 bytes, 256 bytes, etc.). In other implementations, the eROCs may have variable lengths and may be separated by predetermined identifiers or strings (e.g., parameter-value pairs in a URL, etc.).

In some implementations, an eROC may be provided for each content provider in the list received at step 154. In other implementations, the client device may apply policies to filter the list or include or exclude content providers. For example, in some implementations, the client device may retrieve a Terms of Service (ToS) document from each domain to ensure compliance with privacy and security requirements. The client device may generate an eROC for the provider only if a ToS document can be retrieved, and/or only if the ToS document includes or matches predetermined strings (e.g., security policies, legal indemnifications, etc.). Similarly, in some implementations, the client device may maintain a whitelist and/or blacklist of content providers, such that a provider must be identified in the whitelist, or not identified in the blacklist, for the client device to generate an eROC for the provider. This may provide a user or administrator with a measure of control over content providers that may receive identifiable information. In some implementations, blacklists may be provided by third party entities, such as security agencies or groups that have identified malicious actors.

Upon receipt of the eROCs, the intermediary server 102 may extract each eROC from the response and forward the eROC to the corresponding content provider at step 160, with a request for content. In some implementations, the server 102 may extract and forward requests in serial, waiting for a response from a content provider or expiration of a timeout timer before extracting and forwarding the next request; while in other implementations, the server may extract and forward a plurality of requests in parallel.

Each content provider, upon receipt of the request and the eROC corresponding to said content provider, may decrypt the eROC using their private key to recover the ROC at step 162. As discussed above, because the ROC is generated as a random number or a one-way hash result, the content provider may not be able to extract the client device's private identifier. Nonetheless, the ROC may be unique to that content provider, and can be used to uniquely identify the client device as a content provider-specific identifier (CPSID). The content server may select content for delivery to client device, and may transmit the content to the intermediary server 164, which may forward the content to the client device at step 166. In some implementations, the content server may transmit the content directly to the client device. For example, in some implementations, the client device may transmit an eROC and request to each content server 104 identified in the list at step 154, bypassing the intermediary server at steps 158-160; and the content server may reply to bypass the intermediary server at steps 164-166. In some such implementations, the ROCs need not be encrypted separately; rather, each request transmitted directly to the corresponding content server 104 may be transmitted via an encrypted protocol, such as HTTPS. In such implementations, the ROC may be protected against third party actors by the protocol encryption, and need not be separately encrypted by the client. Instead, the ROC may be encrypted only for indirect communications (e.g., via the intermediary server or other content servers, as discussed below).

As discussed above, in some implementations, content servers 104 may have a legitimate need to share user data (e.g., for federated services between domains). To accomplish this while maintaining security and privacy, in some implementations, a first content server 104 and/or intermediary server 102 may signal to the client device that it wishes to exchange data with a second content server. This may be done via a javascript call to a browser API, via special tag parameters in a web page, via a publicly-accessible partner file (e.g., identifying domains with which the content provider will share data, etc.), via an HTTPS response header identifying another domain in metadata, or any other such means. To allow the data exchange, the client device may transmit an eROC corresponding to the first content provider to said first content provider (so that the first content provider can decrypt the ROC and identify the client device), and may also transmit an eROC corresponding to the second content provider to said first content provider. These eROCs may be transmitted in a request for content to the content provider, for example. Because the first content provider lacks the private key of the second content provider, it may not be able to decrypt the second eROC and recover the second ROC; however, it may forward the second eROC to the partner content provider with a request for the user data. The second content provider, upon receipt of the request, may decrypt the second eROC, identify the client device according to the ROC, and provide the requested data to the first content provider. In some implementations, the content provider may cache or store a mapping between its own ROC and the eROC of its partner content provider for a temporary period, such that it may request further data using the eROC. However, in many implementations, such caching may be disallowed or highly limited, so that the client device may maintain an accurate audit log of user data exchanges.

Because the client device receives the request to share data and provide the eROC, the client device is able to generate an audit log or record of each instance of sharing data between content providers or between intermediary server 102 and content servers 104, as well as apply privacy and security policies (e.g., preventing such data sharing between blacklisted entities or limiting sharing to whitelisted entities, etc.).

Figure 2:
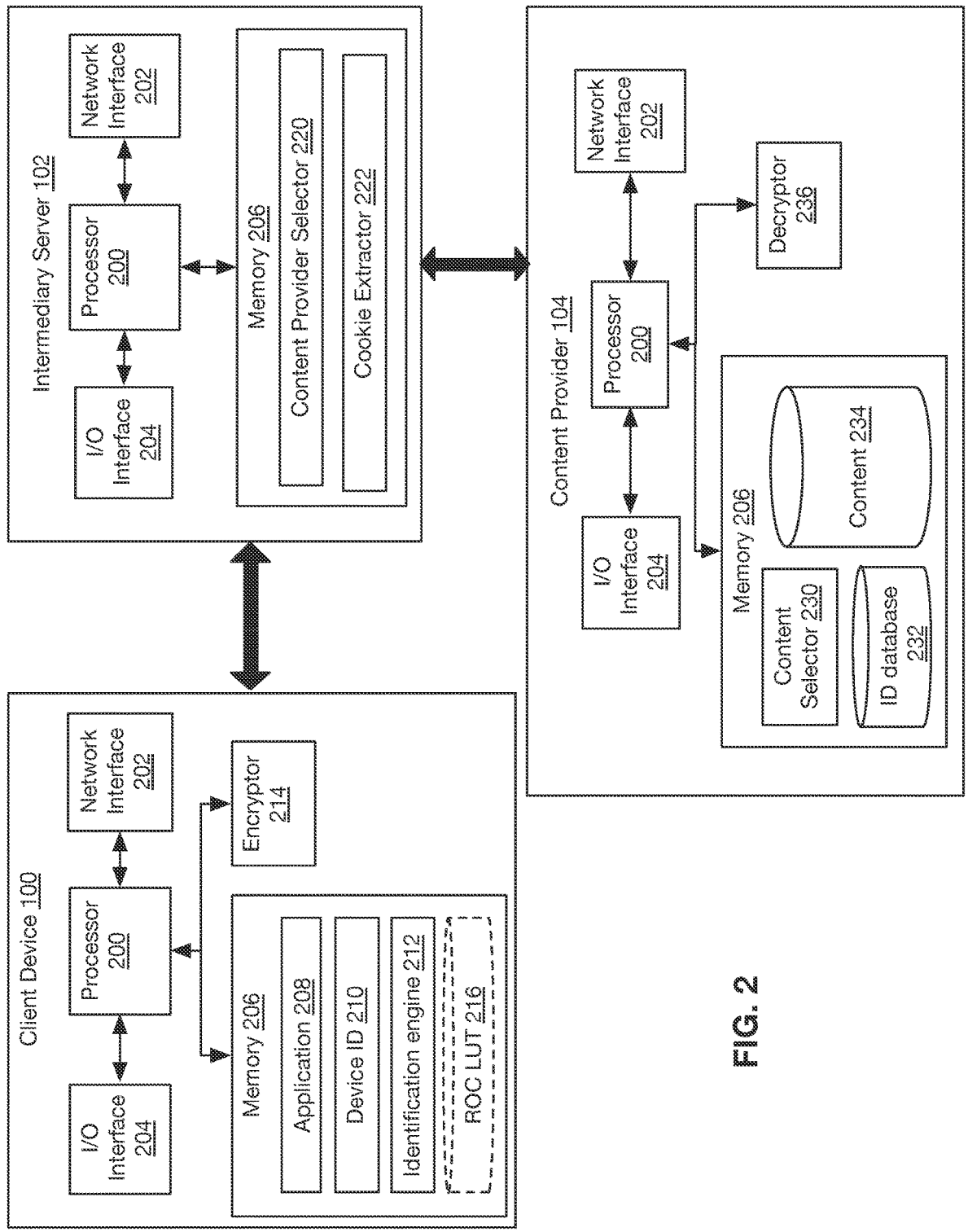
FIG. 2 is a block diagram illustrating implementations of computing devices for use with content provider-specific identifiers.

FIG. 2 is a block diagram illustrating implementations of computing devices for use with content provider-specific identifiers. As discussed above, client device(s) 100 may be referred to variously as a client, device, client device, computing device, user device, or any other such term, may be a desktop computer, laptop computer, tablet computer, smartphone, video game console, smart television or set top box, server, workstation, or any other type and form of computing device capable of communicating over a network 106. In some implementations, a client device 100 may execute an application, service, server, daemon, routine, or other executable logic for communicating over a network 106, such as a web browser, mail client, video player, music player, video game, or any other such application. Such applications may include a command line interface, graphical user interface, or any combination of these or other interfaces. In implementations in which a client device is a smart television or set top box, the client device may receive content via a first interface, such as a terrestrial, satellite, or cable broadcast; and may communicate with an audience measurement server via a second interface via network 106, such as an Ethernet or WiFi interface. In other implementations, client device 100 may receive content via network 106 and may transmit identifications of interactions via network 106.

Client device 100 may be any number of different types of user electronic devices configured to communicate via network 106, including without limitation, a laptop computer, a desktop computer, a tablet computer, a smartphone, a digital video recorder, a set-top box for a television, a video game console, or any other type and form of computing device or combinations of devices. In some implementations, the type of client device 100 may be categorized as a mobile device, a desktop device or a device intended to remain stationary or configured to primarily access network 106 via a local area network, or another category of electronic devices such as a media consumption device.

In many implementations, client device 100 includes a processor 200 and a memory 206. Memory 206 may store machine instructions that, when executed by processor 200 cause processor 200 to perform one or more of the operations described herein. Processor 200 may include a microprocessor, ASIC, FPGA, etc., or combinations thereof. In many implementations, processor 200 may be a multi-core processor or an array of processors. Memory 206 may include, but is not limited to, electronic, optical, magnetic, or any other storage devices capable of providing processor 200 with program instructions. Memory 206 may include a floppy disk, CD-ROM, DVD, magnetic disk, memory chip, ROM, RAM, EEPROM, EPROM, flash memory, optical media, or any other suitable memory from which processor 200 can read instructions. The instructions may include code from any suitable computer programming language such as, but not limited to, C, C++, C#, Java, JavaScript, Perl, HTML, XML, Python and Visual Basic.

Client device 100 may include one or more network interfaces 202. A network interface 202 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network 106. In many implementations, client device 100 may include a plurality of network interfaces 202 of different types, allowing for connections to a variety of networks 106 or a network 106 such as the Internet via different sub-networks.

Client device 100 may include one or more user interface devices 204. A user interface device 204 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 100, such as a built-in display, touch screen, microphone, etc., or external to the housing of client device 100, such as a monitor connected to client device 100, a speaker connected to client device 100, etc., according to various implementations.

Client device 100 may include in memory 206 an application 208 or may execute an application 208 with a processor 200. Application 208 may be an application, applet, script, service, daemon, routine, or other executable logic for receiving content and displaying or otherwise outputting content via an output interface 204 of the client device (e.g., display, speaker, etc.). In one implementation, application 208 may be a web browser. Application 208 may include functionality for displaying content received via network interface 202 and/or generated locally by processor 200. In some implementations, application 208 may be a media player or include an embedded media player, such as a plug-in or native media player within a web browser. Application 208 may provide user interfaces for interacting with content played in the media player, such as a skip control, dislike button, or any similar interface.

Client 100 may include or be identified with a device identifier 210. Device identifier 210 may be an alphanumeric string, data string, serial number, media access control (MAC) address, internet protocol (IP) address, username or account name, globally unique identifier (GUID), cookie, random or pseudorandom number, or any other type and form of identifier, including combinations of these or other identifiers. In some implementations, the device identifier 210 may be fixed to the device or preconfigured in the device, such as a manufacturer serial number or MAC address, while in other implementations, the device identifier 210 may be dynamically set by a content provider, streaming server, application 208, or other entity, such as a cookie or username. In some implementations, a unique or new device identifier 210 may be set for each communication to a content provider and/or audience measurement server, while in other implementations, the device identifier 210 may not be changed, or may be changed periodically (e.g., hourly, daily, weekly, etc.) or at other intervals (e.g., on restart of the client device, login to an internet service, etc.). In some implementations, a device identifier 210 may be associated with one or more other device identifiers 210 (e.g., a device identifier for a mobile device, a device identifier for a home computer, etc.). In many implementations, as discussed above, a device identifier 210 may be generated and/or transmitted to the device 100 by a content provider. In other implementations, as discussed above, client 100 may request a device identifier or cookie 210 from a measurement service or content provider, and may transmit the device identifier or cookie 210 to the measurement service or content provider in association with requests for content or measurement data.

Client device 100 may include, in various implementations, a read-only cookie lookup table (LUT) 216; and/or an encryptor 214. As discussed above, in some implementations, a ROC LUT 216 may comprise random identifiers for each content provider, indexed by an identifier of the corresponding content provider (e.g., domain name, address, etc.). The random identifiers may be pregenerated, or generated dynamically (e.g., upon adding a new provider to the LUT). In some implementations, a device identifier 210 may be used as a seed for generation of the random identifiers. In other implementations, an encryptor 214 may be used to calculate hash results from inputs of the device identifier 210 and a domain or address of the content provider (and potentially additional entropic salt, as discussed above). The encryptor 214 may comprise hardware or software, or a combination of hardware and software. In some implementations, encryptor 214 may comprise an encryption module, a trusted platform module (TPM), an ASIC, or any other type and form of circuitry for performing encryption and cryptographic hash calculations.

Client device 100 may execute an identification engine 212. Identification engine 212 may comprise an application, server, service, daemon, routine, or other executable logic for identifying and retrieving ROCs from a lookup table 216, or for generating a ROC for a content provider based on a device identifier 210 and domain or address of the content provider. Identification engine may be configured to generate or retrieve a plurality of ROCs, encrypt the ROCs via encryptor 214, and transmit the encrypted ROCs to the intermediary server or directly to content providers 104 (e.g., with a request for content).

Also illustrated in FIG. 2 is a block diagram of an implementation of an intermediary server 102. As with client devices 100, intermediary server 102 may include one or more processors 200, memories or storage devices 206, network interfaces 202, and user interfaces 204. In some implementations referred to as headless servers, a server 102 may not include a user interface 204, but may communicate with clients 100 or content providers with user interfaces 204 via a network 106. In some implementations, memory 206 may store one or more applications for execution by processor 200 of the server, including FTP servers, web servers, mail servers, file sharing servers, peer to peer servers, or other such applications for delivering content or redirection commands to allow clients to access content at a content provider.

Intermediary server 102 may, in some implementations, include a content provider selector 220 and/or a cookie extractor 222. Content provider selector 220 and cookie extractor 222 may each comprise applications, servers, services, daemons, routines, or other executable logic. Content provider selector 220 may be configured to select content providers 104 from a list of content providers, e.g., via a round robin or other load balancing system, or via an auction-based system. Accordingly, content provider selector 220 may be configured to transmit requests to and receives responses from content providers 104 in some implementations, such as bids for opportunities to provide content to a client device. Content provider selector 220 may also be configured to generate a response to a request of a client device 100 comprising identifiers, such as domains or addresses, of selected content providers, so that the client device may generate corresponding eROCs.

As discussed above, in some implementations, these eROCs may be provided to intermediary server 102 in a further request from the client; in such implementations, a cookie extractor 222 may extract each eROC from the request and forward the request and a corresponding eROC to each content provider. In other implementations, the client device may request content of content providers directly, and may transmit the request and corresponding eROC to each content provider. In some implementations, each eROC may be received as a parameter value pair in a request, as concatenated strings of data (e.g., separated by delimiters or having a fixed length, in various implementations), or in any other such format. Thus, the cookie extractor 222 may be configured to extract a predetermined number of bytes from a received request consisting of an eROC and forward the extracted eROC to the corresponding content provider. In some implementations, each content provider may be explicitly identified in the request for content received from the client. For example, the request may comprise sets of content provider identifiers and eROCs (e.g., "example.com, [eROC]; example.org, [eROC]; etc.", either separated by delimiters or other identifiers or with predetermined lengths dividing corresponding fields. In other implementations, the set of eROCs may correspond one-to-one with the list of content providers provided to the client device by the intermediary server (e.g., at step 154 of FIG. 1D discussed above). For example, given a list identifying a plurality of content providers (e.g. "example1.org, example2.org, example3.org, etc."), the client may generate or retrieve eROCs for each content provider and append them to a request in the same order (e.g. "eROC1, eROC2, eROC3, etc."); accordingly, the intermediary server may extract each eROC and forward it to the corresponding content provider in the order identified in the list, without needing re-identification of each content provider in the request from the client. The server may need to maintain the list in a buffer or cache in such implementations. In a further such implementation, if any content provider 104 does not match a policy of the client device (e.g., is not listed in a whitelist or is listed in a blacklist maintained by the client device, or lacks a compliant ToS document), the client device may provide a default (e.g., all zeroes), null, or random data string in place of the eROC for such content provider. For default or null data strings, the intermediary server 102 may be configured to discard the data string without forwarding it to the content provider. For random data strings, the intermediary server 102 may forward such string to the content provider as if it were a proper eROC, with the content provider either unable to decrypt the data string or only able to recover invalid data.

Also illustrated in FIG. 2 is a content provider 104. A content provider 104 may include one or more computing devices connected to network 106 and configured for providing content to a client 100, either directly or via an intermediary server 102. A content provider may be referred to variously as a content provider, server, web server, data server, publisher, service provider, or by other similar terms. In many implementations, content provider may include a plurality of computing devices configured as a server farm or cloud, and may include routers, load balancers, network address translators, firewalls, or other such devices. Content providers may be computer servers (e.g., FTP servers, file sharing servers, web servers, etc.) or combinations of servers (e.g., data centers, cloud computing platforms, etc.). Content providers may provide any type and form of content, including text, images, video, audio, multimedia, or other data, or any combination of these. Content may include live media content, prerecorded media content, rendered content, movies, television shows, podcasts, video blogs, video games or other interactive content, advertising in any format, social media, or any other type and form of content.

Content provider 104 may include one or more processors 200, network interfaces 202, I/O interfaces 204, and/or memory devices 206 as shown. In many implementations, content provider 104 may comprise a plurality of computing devices, including virtual machines executed by physical devices. For example, a content provider 104 may comprise a plurality of virtual machines executed by one or more physical computing devices, each such virtual machine executing a content server (e.g., web server, file server, streaming media server, etc.) and in communication with one or more storage devices, such as network storage devices, RAID storage devices, or other such devices.

Content provider 104 may include a content selector 230. Content selector 230 may comprise an application, service, server, daemon, routine, or other executable logic for selecting content from content storage 234 for delivery to a client device 100. In many implementations, content selector 230 may select content for delivery to the client based on information about the client stored in an identifier database 232. For example, the database 232 may comprise information about device capabilities (e.g., screen resolution or orientation, color depth, bandwidth, etc.) or any other such information for selection of customized content, indexed by ROC. Upon receipt of an eROC from the intermediary server 102 or directly from the client device 100 in some implementations, the content provider 104 may decrypt the eROC to recover the read-only cookie (ROC). The content selector 230 may identify the information about the client in database 232 via the cookie and select corresponding content from storage 234. The content selector 230 may, in various implementations, push or stream the content to the client device 100, provide a unique resource identifier (URI) or address of content to the client device such that the client application 208 may subsequently request the content for delivery and rendering (e.g., from a web server of content provider 104), or provide the URI or address to intermediary server 102 for forwarding to the client device.

Although content storage 234 is shown within memory 206, in many implementations, content storage 234 may be provided by one or more additional storage devices in communication with the content provider (e.g., a storage cloud, network storage, etc.). As discussed above, content storage 234 may comprise any type and form of data, including audio, video, animations, text, multimedia, still or animated graphics, executable scripts, or any other type and form of content.

As discussed above identifier database 232 may comprise a database, flat file, indexed file, or other type and form of data structure for associating information about a client device, account, or session with a read-only cookie or content provider-specific identifier. In some implementations, identifier database 232 may be stored in memory 206, while in other implementations, identifier database 232 may be stored separately and provided to content selector 230 (e.g., by a separate database server).

Content provider 104 may include a decryptor 236. Decryptor 236 may comprise software, hardware, or a combination of hardware and software for decrypting encrypted read-only cookies via a private key of the content provider. Decryptor 236 may perform any suitable type of decryption algorithm, and may comprise decryption circuitry such as an ASIC, a FPGA, a trusted platform module (TPM), or other such elements.

Figure 3A:
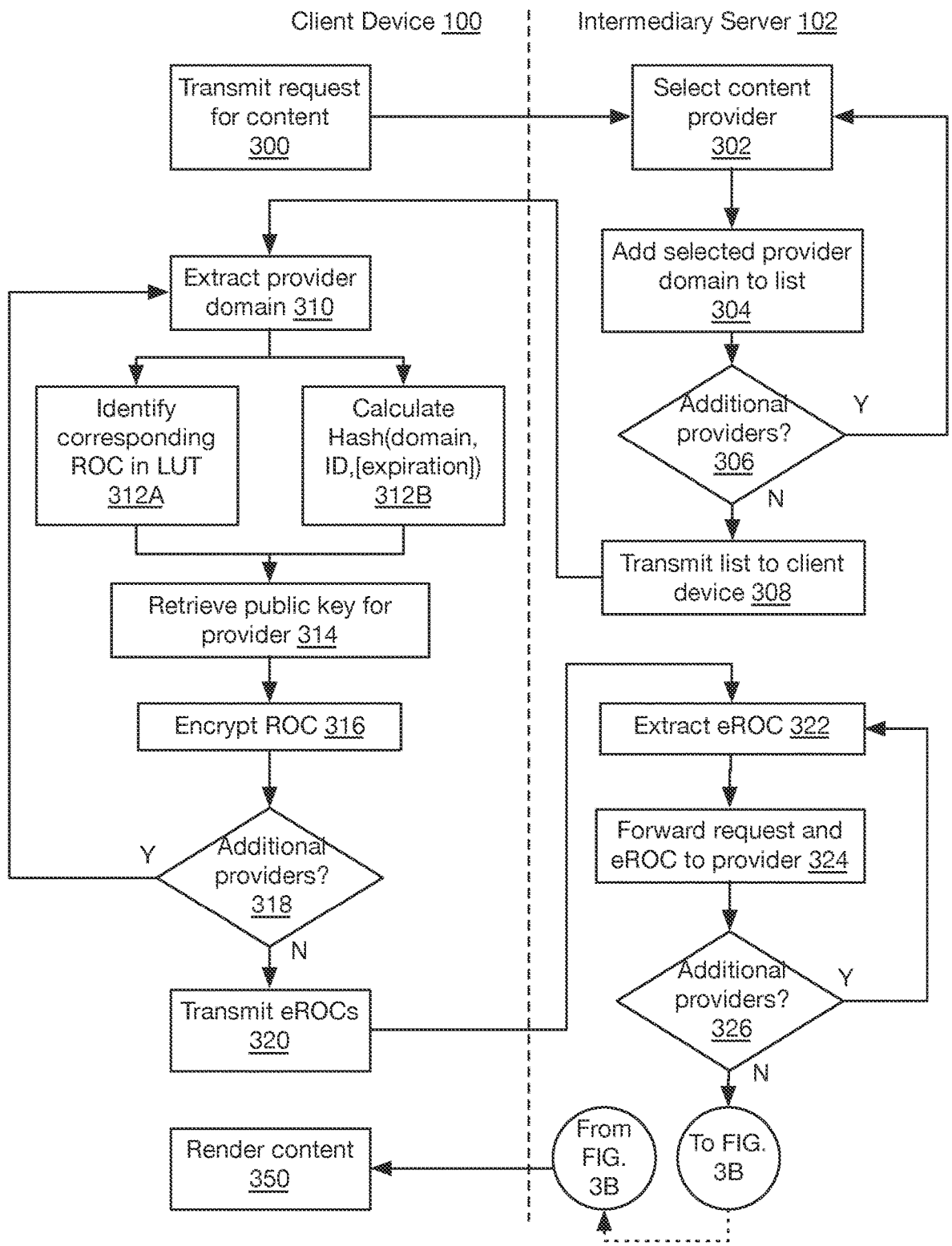
FIGS. 3A and 3B are flow charts illustrating an implementation of a method for data exchange using content provider-specific identifiers.
Figure 3B:
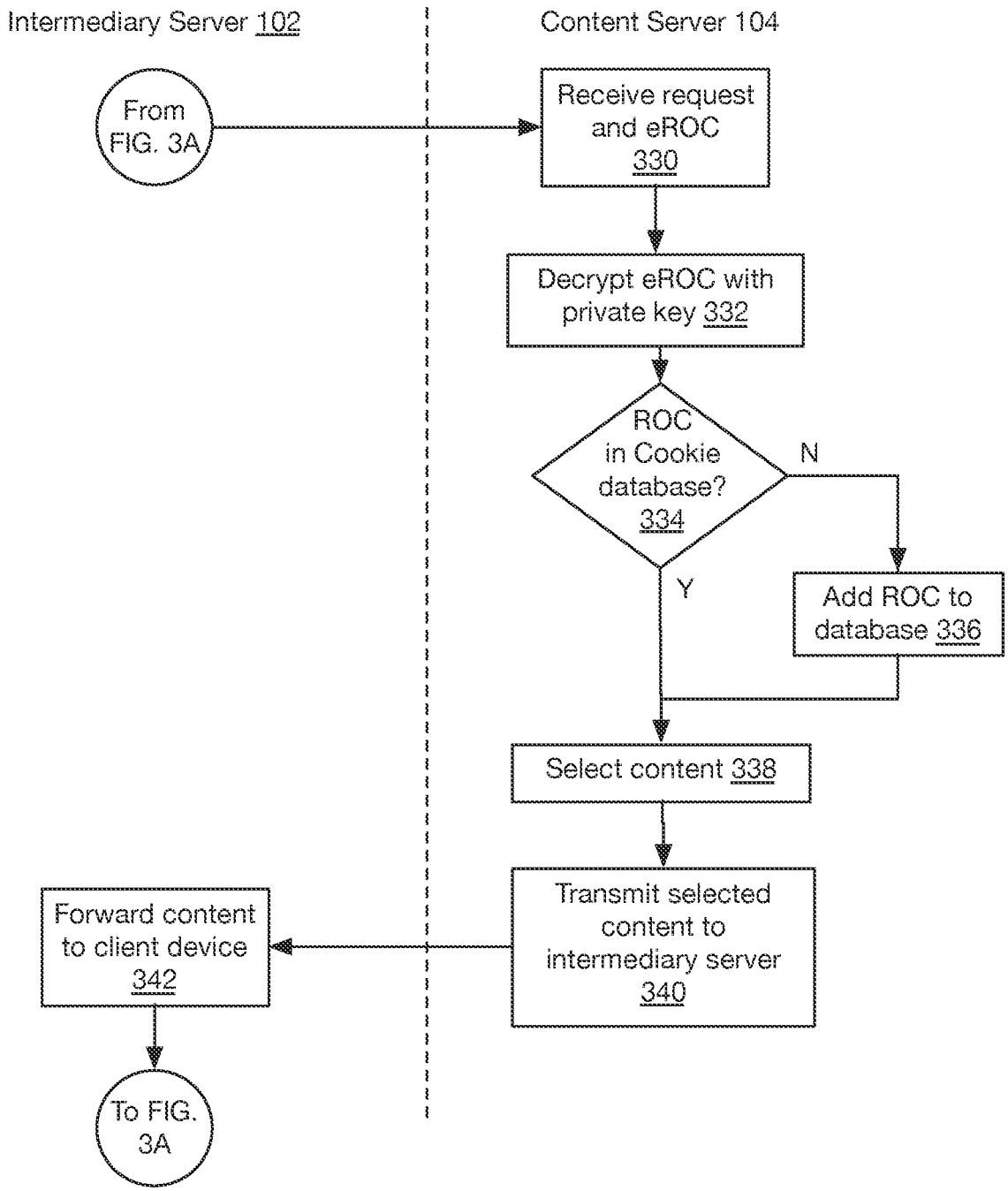

FIGS. 3A and 3B are flow charts illustrating an implementation of a method for data exchange using content provider-specific identifiers or read-only cookies. Each flow chart is divided in part to show steps or procedures performed by the client device(s) 100, intermediary server(s) 102, or content provider(s) 104.

At step 300, in some implementations, the client device 100 may transmit a request for content to an intermediary server 102. In some implementations, an application on the client device 100 such as a web browser or media application may generate the request for content, such as during rendering of a web page or encountering a timed event during playback of another item of content. The request may be transmitted via any suitable means (e.g., HTTPS request, RESTful request, etc.), and may include performing a handshaking procedure in some implementations. The request may, in some implementations, include a device identifier, account identifier, user identifier, session identifier, or other such identifier, or a cookie generated by the client device (e.g., ROC) for the intermediary server 102 to uniquely identify the client device. For example, in some implementations, intermediary server 102 may previously provide a cookie to client device 100 (e.g., during an authentication procedure or other such event), and client device 100 may provide the same cookie in the request thereafter.

At step 302, in some implementations, the intermediary server 102 may select a content provider to potentially provide content to the client device. The content provider may be selected via any method, such as an auction system or round robin algorithm or other load balancing system, as discussed above. In some implementations, the intermediary server 102 may transmit a request to the content server 104 to obtain a bid, confirm that it can provide content, or other such requests (not illustrated), and may select the content server 104 based on the response.

At step 304, the intermediary server 102 may add the selected provider to a list of providers to potentially provide content. Adding the provider may comprise adding a domain name or address of the provider to the list, concatenating the domain name or address to a set of names or addresses, or otherwise adding an identification of the provider to the list.

At step 306, the intermediary server may determine if additional providers should be added to the list. In some implementations, the list may have a predetermined length (e.g., 5 providers, 10 providers, etc.), and the intermediary server may add providers until reaching this length. In other implementations, the intermediary server may add providers until reaching a timer expiration. For example, the intermediary server 102 may transmit requests to content providers for bids or availability to provide content, and may add any providers to the list that have responded within 5 seconds, 3 seconds, 1 second, or any other such time period. Steps 302-306 may be repeated iteratively until the list is complete (e.g., reaching the predetermined length or time period, or having issued requests to all providers or adding all providers to the list, etc.). At step 308, the intermediary server may transmit the generated list to the client device as a response to the first request.

At step 310, the client device may extract a first content provider domain or address from the list. As discussed above, the list may include fields of a predetermined length, or variable length fields separated by delimiters, in various implementations. The client device may extract a domain or address according to the length or delimiters, accordingly.

As discussed above, in some implementations, the client device may maintain a lookup table with randomly generated read-only cookies for each content provider, indexed by the content provider domain or address or other identifier. In such implementations, at step 312A, the client device may identify the corresponding ROC. As discussed above, in some implementations, the table may be pre-populated with random ROC values. In other implementations, the client device may determine whether a ROC exists in the table for the provider; and if not, may generate a new random ROC for the provider (e.g. using a private identifier of the client device, random seed, or system time, and/or any other source of entropy, including hardware random number generators, software random number generators, network characteristics (e.g. latency, jitter, error rates, etc.), or any other such information).

In other implementations, at step 312B, the client device may calculate a result of a hashing algorithm applied to inputs of the domain or address or other identifier of the content provider, and a private key or identifier of the client device. In some implementations, additional entropy may be used, such as an expiration or creation time of the cookie. Any suitable hashing algorithm may be used. In some implementations, cookies may be stored or cached by the client device after generation (for a temporary period, such as until a predetermined expiration period ends, in some implementations) to reduce computing resources needed for the cryptographic hashing. In such implementations, as with step 312A, the client device may first determine whether a ROC for the content provider has been previously generated and stored in the cache; and if not, may calculate the hash and generate the new ROC.

At step 314, in some implementations, the client device may retrieve a public key of the content provider, e.g., at a predetermined address (e.g., "[domain]/key.html") or other such location, or may initiate a HTTPS/TLS handshaking session to obtain the public key of the content provider. In another implementation, a predetermined "trusted" server may fetch public keys of multiple content providers for transmission to or retrieval by each client device. At step 316, the client device may encrypt the cached, retrieved, or generated ROC with the public key for the corresponding content provider. In many implementations, step 314 may be performed prior to step 312A or 312B. In many implementations, the public key of the content provider may be cached or stored by the client device during a first communication or iteration of the method, and during subsequent iterations, the client device may retrieve the public key from the cache or data storage. For example, the lookup table may store the ROC for a content provider as well as its previously retrieved public key. In implementations in which the ROC is calculated from the hash, a client device may still maintain a lookup table of public keys indexed by content provider domain or address for retrieval at step 314.

At step 318, the client device may determine if the list includes additional providers, and if so, may repeat steps 310-318.

As discussed above, in some implementations, the client device may apply security or privacy policies to the list of providers. For example, after step 310, prior to generating or retrieving a ROC for a provider, the client device may first determine whether the provider is identified in a blacklist or is not identified in a whitelist. If so, the client device may skip directly to step 318. Similarly, in some implementations, the client device may determine if the provider has a compliant ToS agreement (e.g., by retrieving the agreement from a predetermined address, such as "[domain]/tos.html"). If not, the client device may skip directly to step 318.

Similarly, in some implementations, the client device may record in an audit log an identification of each content provider that was identified in the list and/or was selected to provide content to the client device. The audit log can therefore indicate which content provider or providers may share user data with Intermediary Server 102, or which pair of content providers may share user data between themselves. The audit log provides transparency for a user of the client device and further control over security and privacy of user information.

At step 320, in some implementations, the client device may transmit the set of encrypted ROCs (eROCs) to the intermediary device. As discussed above, the eROCs may be concatenated or separated by delimiters, and may include identifications of corresponding content providers or may be in order corresponding to the original received list. At step 322, in some implementations, the intermediary server may extract an eROC from the set, e.g., according to the delimiter or fixed length. At step 324, the intermediary server may forward the eROC and a request for an item of content to a provider. In some implementations, forwarding the eROC and request may include requesting a bid to provide content to the client device. At step 326, the intermediary server may determine if the received communication from the client device includes additional eROCs, and if so, may repeat steps 322-326 for each additional eROC.

In other implementations, as discussed above, the client device may transmit each eROC to the corresponding content provider, bypassing the intermediary server. This may be done, for example, in implementations in which the intermediary server performs load balancing or an auction at step 302, and particularly if the intermediary server only selects a single content provider. In such a case, no extraction and forwarding of eROCs from a plurality of eROCs need be performed, and the client device may instead communicate directly with the content provider.

Turning to FIG. 3B, each content server 104 may receive the request for content and eROC from the intermediary server 102 as shown (or a content server 104 may receive the request and eROC directly from the client device, as discussed above in some implementations). At step 332, the content server may decrypt the eROC using its private key.

At step 334, the content server may determine if the decrypted ROC is in its local cookie database. The ROC may not be in its database if, for example, this is the first time it has received a content request from particular client, or if an older ROC for the client has since expired, or user has reset the ROC, such that the client generated a new ROC. If the ROC is not in its database, then the content server may add the ROC to its local database at step 336.

At step 338, the content server may select an item of content for delivery to the client device. The content item may be selected via any suitable means, and may be personalized or customized for the client device, e.g., based on information associated with the ROC in the local database of the content server, and based on information received from the client device, web browsing or search histories associated with the client device, previous content requests or interactions, or any other type and form of information.

In some implementations, at step 340, the content server may transmit the selected content to the intermediary server. The intermediary server may forward the content to the client device at step 342. In some implementations, the intermediary server may receive content from a plurality of content servers 104 (for example, steps 330-340 may be performed in parallel by a plurality of content servers). The intermediary server may select an item of content to forward to the client device at step 342, such as via a bidding process or auction, or responsive to the first item of content received from the plurality of content servers, with remaining items of content discarded. In other implementations, the content server may transmit the selected content directly to the client device, bypassing step 342. Returning briefly to FIG. 3A, upon receipt of the selected item of content, the client device may render or display the content at step 350.

Accordingly, the systems and methods discussed herein provide a replacement for traditional browser cookies with a secure, user-transparent, and highly efficient content provider-specific identifier ("CPSID"), sometimes referred to as a "read-only cookie" ("ROC"). These content provider-specific identifiers may be generated by the client device and encrypted with a public key of the content provider, preventing third parties from indirectly identifying matches, and obviating the need for provider-side cookie matching tables and resource-intensive tracking communications. The generation of content provider-specific identifiers may be controlled by user policies, such that identifiers are only created for content providers with compliant terms of service (ToS), e.g., retrievable from a predetermined address within the domain; content providers that are on a whitelist (e.g. for which the user has explicitly provided consent); and/or content providers that are not on a blacklist (e.g. for which the user has explicitly refused consent). Additionally, these systems and methods may be applied to device identification systems that are similar to conventional browser cookies, such as the Identifier for Advertisers (IDFA) or Advertiser ID (AdID) systems. In convention implementations of these systems, a user-resettable identifier may be utilized on the client device and provided to content servers in requests on a recipient-agnostic basis, and the servers may freely exchange data using the IDFA or AdID identifier with no user oversight or control. Instead, the disclosed methods and systems may be used to provide content server-specific identifiers or ROCs.

In one aspect, the present disclosure is directed to a method for controlled data exchange among domains. The method includes receiving, by a network interface of a client device from an intermediary server, a list of content providers selected by the intermediary server. The method includes, for each content provider in the list of content providers: generating, by an identification engine of the client device, a content provider-specific identifier, and encrypting, by an encryptor of the client device, the content provider-specific identifier using an encryption key of the corresponding content provider. The method also includes transmitting, by the network interface of the client device to the intermediary server, the encrypted content provider specific identifiers for each content provider in the list of content providers, the intermediary server forwarding each encrypted content provider-specific identifier to the corresponding content provider.

In some implementations, generating the content provider-specific identifier includes calculating, by the encryptor, a cryptographic hash of inputs comprising an identifier of the client device and a domain name of the corresponding content provider. In a further implementation, the inputs to the cryptographic hash further comprise an expiration time for the content provider-specific identifier. In another further implementation, the identifier of the client device is specific to an application executed by the client device. In some implementations, generating the content provider-specific identifier includes identifying, by the identification engine, a predetermined random value in a lookup table at an index associated with a domain name of the corresponding content provider. In some implementations, generating the content provider-specific identifier includes determining, by the identification engine, that the corresponding content provider is not identified in a blacklist of the client device. In some implementations, generating the content provider-specific identifier includes determining, by the identification engine, that the corresponding content provider is identified in a consent list of the client device. In some implementations, generating the content provider-specific identifier includes retrieving, by the identification engine via the network interface, a public key of the corresponding content provider. In some implementations, the method includes adding an indication of each corresponding content provider to a log of content providers receiving identifiers.

In another aspect, the present application is directed to a system for controlled data exchange among domains. The system includes an identification engine configured to generate, for each content provider in a list of content providers received from an intermediary server, a content provider-specific identifier. The system also includes an encryptor configured to encrypt each content provider-specific identifier using an encryption key, e.g., public key, of the corresponding content provider; and a network interface configured to transmit, to the intermediary server, the encrypted content provider specific identifiers for each content provider in the list of content providers, the intermediary server forwarding each encrypted content provider-specific identifier to the corresponding content provider.

In some implementations, the encryptor is further configured to calculate, for each content provider in the list of content providers, a cryptographic hash of inputs comprising an identifier of the client device and a domain name of the corresponding content provider. In a further implementation, the inputs to the cryptographic hash further comprise an expiration time for the content provider-specific identifier. In another further implementation, the identifier of the client device is specific to an application executed by the client device.

In some implementations, the identification engine is further configured to identify, for each content provider in the list of content providers, a predetermined random value in a lookup table at an index associated with a domain name of the corresponding content provider. In some implementations, the identification engine is further configured to determine that each content provider in the list of content providers is not identified in a blacklist of the client device. In some implementations, the identification engine is further configured to determine that each content provider in the list of content providers is identified in a consent list of the client device. In some implementations, the identification engine is further configured to retrieve, via the network interface, a public key of each content provider in the list of content providers. In some implementations, the identification engine is further configured to add an indication of each corresponding content provider to a log of content providers receiving identifiers.

In another aspect, the present disclosure is directed to a system for controlled data exchange. The system includes a network interface in communication with a client device and a plurality of content providers, the network interface configured to receive a request for content from the client device. The system also includes a content provider selector configured to select a subset of the plurality of content providers, and generate a list comprising identifications of each content provider of the selected subset. The network interface is further configured to: transmit the list to the client device; receive, from the client device, a response comprising an encrypted content provider-specific identifier for each content provider of a further subset of the plurality of content providers; transmit, to each content provider of the further subset, a further request for content, each further request comprising the encrypted content provider-specific identifier corresponding to the recipient content provider; receive, from a first content provider, an item of content selected by the content provider based on the received encrypted content provider-specific identifier; and forward the received item of content to the client device for presentation by the client device.

In some implementations, the system includes an identifier extractor configured to extract each encrypted content provider-specific identifier from the response, and associate each extracted encrypted content provider-specific identifier with the corresponding content provider.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, such as a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for controlled data exchange among domains, comprising:

transmitting, by a first content provider and to a client device, a request for an encrypted content provider-specific identifier of a second content provider that enables the first content provider to exchange data with the second content provider, wherein the first content provider differs from the second content provider;

receiving, by the first content provider and from the client device, the encrypted content provider-specific identifier that has been encrypted, by the client device, using a public key of the second content provider that prevents the first content provider from decrypting the encrypted content provider-specific identifier;

forwarding, by the first content provider, the encrypted content provider-specific identifier to the second content provider as an indication that the client device has authorized data exchange between the first content provider and the second content provider;

obtaining, by the first content provider and from the second content provider, data about user interactions stored at the second content provider in response to the second content provider decrypting the encrypted content provider-specific identifier forwarded by the first content provider;

selecting, by the first content provider, content using the data about user interactions obtained from the second content provider; and transmitting, by the first content provider, the content selected using the data about user interactions obtained from the second content provider to the client device.

2. The method of claim 1, wherein receiving the content provider-specific identifier comprises receiving a cryptographic hash generated by a client-side encryptor using inputs comprising an identifier of the client device and a domain name of the second content provider.

3. The method of claim 2, wherein the identifier of the client device is specific to an application executed by the client device.

4. The method of claim 2, wherein the inputs used to generate the cryptographic hash further comprise an expiration time for the content provider-specific identifier.

5. The method of claim 2, wherein the inputs used to generate the content provider-specific identifier comprise a predetermined random value from a lookup table located at an index associated with a domain name of the corresponding content provider.

6. The method of claim 1, wherein decryption of the content provider-specific identifier of the second content provider requires a private key of the second content provider that is not known by the first content provider, thereby preventing the first content provider from decrypting the content provider-specific identifier of the second content provider.

7. The method of claim 1, further comprising:

storing, by the first content provider, a mapping between the content provider-specific identifier of the second content provider and a content provider-specific identifier of the first content provider; and requesting, by the first content provider and using the mapping, additional data about user interactions stored at the second content provider that correspond to the content provider-specific identifier of the second content provider.

8. A system for controlled data exchange among domains, comprising:

one or more computers of a first content provider; and one or more storage devices coupled with the one or more computers and storing instructions that, when executed by the one or more computers, cause the one or more computers to perform operations comprising:

transmitting, to a client device, a request for an encrypted content provider-specific identifier of a second content provider that enables the first content provider to exchange data with the second content provider, wherein the first content provider differs from the second content provider;

receiving, from the client device, the encrypted content provider-specific identifier that has been encrypted, by the client device, using a public key of the second content provider that prevents the first content provider from decrypting the encrypted content provider-specific identifier;

forwarding the encrypted content provider-specific identifier to the second content provider as an indication that the client device has authorized data exchange between the first content provider and the second content provider;

obtaining, from the second content provider, data about user interactions stored at the second content provider in response to the second content provider decrypting the encrypted content provider-specific identifier forwarded by the first content provider;

selecting content using the data about user interactions obtained from the second content provider; and transmitting the content selected using the data about user interactions obtained from the second content provider to the client device.

9. The system of claim 8, wherein receiving the content provider-specific identifier comprises receiving a cryptographic hash generated by a client-side encryptor using inputs comprising an identifier of the client device and a domain name of the second content provider.

10. The system of claim 9, wherein the identifier of the client device is specific to an application executed by the client device.

11. The system of claim 9, wherein the inputs used to generate the cryptographic hash further comprise an expiration time for the content provider-specific identifier.

12. The system of claim 9, wherein the inputs used to generate the content provider-specific identifier comprise a predetermined random value from a lookup table located at an index associated with a domain name of the corresponding content provider.

13. The system of claim 8, wherein decryption of the content provider-specific identifier of the second content provider requires a private key of the second content provider that is not known by the first content provider, thereby preventing the first content provider from decrypting the content provider-specific identifier of the second content provider.

14. The system of claim 8, wherein the instructions cause the one or more computers of the first content provider to perform operations further comprising:

storing, by the first content provider, a mapping between the content provider-specific identifier of the second content provider and a content provider-specific identifier of the first content provider; and requesting, using the mapping, additional data about user interactions stored at the second content provider that correspond to the content provider-specific identifier of the second content provider.

15. At least one non-transitory computer medium storing instructions, that when executed by one or more data processing apparatus of a first content provider, cause the one or more data processing apparatus of the first content provider to perform operations comprising:

transmitting, to a client device, a request for an encrypted content provider-specific identifier of a second content provider that enables the first content provider to exchange data with the second content provider, wherein the first content provider differs from the second content provider;

receiving, from the client device, the encrypted content provider-specific identifier that has been encrypted, by the client device, using a public key of the second content provider that prevents the first content provider from decrypting the encrypted content provider-specific identifier;

forwarding the encrypted content provider-specific identifier to the second content provider as an indication that the client device has authorized data exchange between the first content provider and the second content provider;

obtaining, from the second content provider, data about user interactions stored at the second content provider in response to the second content provider decrypting the encrypted content provider-specific identifier forwarded by the first content provider;

selecting content using the data about user interactions obtained from the second content provider; and transmitting the content selected using the data about user interactions obtained from the second content provider to the client device.

16. The non-transitory computer medium of claim 15, wherein receiving the content provider-specific identifier comprises receiving a cryptographic hash generated by a client-side encryptor using inputs comprising an identifier of the client device and a domain name of the second content provider.

17. The non-transitory computer medium of claim 16, wherein the identifier of the client device is specific to an application executed by the client device.

18. The non-transitory computer medium of claim 16, wherein the inputs used to generate the cryptographic hash further comprise an expiration time for the content provider-specific identifier.

19. The non-transitory computer medium of claim 16, wherein the inputs used to generate the content provider-specific identifier comprise a predetermined random value from a lookup table located at an index associated with a domain name of the corresponding content provider.

20. The non-transitory computer medium of claim 15, wherein the instructions cause the one or more data processing apparatus of the first content provider to perform operations further comprising:

storing a mapping between the content provider-specific identifier of the second content provider and a content provider-specific identifier of the first content provider; and requesting, using the mapping, additional data about user interactions stored at the second content provider that correspond to the content provider-specific identifier of the second content provider.

\* \* \* \* \*